United States Patent
Schorpp et al.

(10) Patent No.: US 9,759,306 B2
(45) Date of Patent: Sep. 12, 2017

(54) TRANSMISSION DRIVE ASSEMBLY

(75) Inventors: Gerold Schorpp, Au am Rhein (DE); Robert Heitz, Rastatt (DE); Peter Steuer, Karlsruhe (DE); Siegfried Reichmann, Rheinau Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 879 days.

(21) Appl. No.: 14/239,180

(22) PCT Filed: Jun. 20, 2012

(86) PCT No.: PCT/EP2012/061843
§ 371 (c)(1),
(2), (4) Date: May 20, 2014

(87) PCT Pub. No.: WO2013/023822
PCT Pub. Date: Feb. 21, 2013

(65) Prior Publication Data
US 2014/0318311 A1 Oct. 30, 2014

(30) Foreign Application Priority Data
Aug. 16, 2011 (DE) ......................... 10 2011 081 043

(51) Int. Cl.
*H02K 7/08* (2006.01)
*F16H 57/021* (2012.01)
(Continued)

(52) U.S. Cl.
CPC ......... *F16H 57/021* (2013.01); *F16H 57/023* (2013.01); *F16H 57/039* (2013.01);
(Continued)

(58) Field of Classification Search
CPC .... F16H 57/023; F16H 57/039; F16H 57/021; F16H 2057/0213; H02K 7/08;
(Continued)

(56) References Cited

U.S. PATENT DOCUMENTS 4,885,948 A * 12/1989 Thrasher, Jr. .......... H02K 7/081
310/83
5,216,307 A * 6/1993 Hosoya .................. H02K 7/081
310/89

(Continued)

FOREIGN PATENT DOCUMENTS

CN 1942686 4/2007
CN 102135166 7/2011
(Continued)

OTHER PUBLICATIONS

International Search Report for Application No. PCT/EP2012/061843 dated Aug. 30, 2012 (English Translation, 2 pages).

*Primary Examiner* — Burton Mullins
(74) *Attorney, Agent, or Firm* — Michael Best & Friedrich LLP

(57) ABSTRACT

The invention relates to a transmission drive assembly (10) having a drive motor (11) the drive shaft (23) of which protrudes with a portion (25) thereof into a transmission housing (12), wherein the drive shaft (23) is arranged on the side facing the transmission housing (12) in a bearing (32) which is held in a form-fit or force-closed manner in a substantially sleeve-shaped holding element (35; 65) which is arranged in a holding fixture (27) of the transmission housing (12). According to the invention, in an installation position for introducing and positioning the holding element (35; 65) in the holding fixture (27) of the transmission housing (12), the holding element (35; 65) is positioned in a first axial end position defined by an abutment element (30) of the drive motor (11), and, in an end position of the drive shaft (23) in the transmission housing (12), the holding element (35; 65) can be slid by means of a sliding element (Continued)

(47; 61; 62, 63) on the drive shaft (23) into a second axial end position which is axially remote from the at least one abutment element.

12 Claims, 5 Drawing Sheets

(51) Int. Cl.
*F16H 57/023* (2012.01)
*F16H 57/039* (2012.01)

(52) U.S. Cl.
CPC ....... *H02K 7/08* (2013.01); *F16H 2057/0213* (2013.01); *Y10T 74/2186* (2015.01)

(58) Field of Classification Search
CPC ........ H02K 7/081; H02K 7/003; H02K 51/00; H02K 5/00; H02K 5/16; H02K 5/163
USPC ............................ 310/75 R, 83, 90; 74/606 R
See application file for complete search history.

(56) References Cited

U.S. PATENT DOCUMENTS

| | | | |
|---|---|---|---|
| 5,522,669 A | 6/1996 | Recker | |
| 5,641,238 A | 6/1997 | Oswald | |
| 6,664,684 B1 * | 12/2003 | Kobschaetzky | H02K 5/1672 |
| | | | 310/89 |
| 7,839,037 B2 * | 11/2010 | Oberle | H02K 7/1166 |
| | | | 310/154.08 |
| 7,847,449 B2 * | 12/2010 | Oberle | H02K 7/1166 |
| | | | 310/154.08 |

FOREIGN PATENT DOCUMENTS

| | | |
|---|---|---|
| DE | 19813573 | 10/1999 |
| DE | 102009028133 | 2/2011 |
| EP | 2140931 | 1/2010 |
| WO | 2007132624 | 11/2007 |

\* cited by examiner

TRANSMISSION DRIVE ASSEMBLY

BACKGROUND OF THE INVENTION

The invention relates to a transmission drive assembly.

A bearing device for use in a transmission drive assembly is disclosed in the German patent specification DE 10 2009 028 133 A1 of the applicant. In the bearing device, a bearing that serves to mount the armature shaft of an electric drive motor is accommodated in a sleeve-shaped holding element, which in turn can be inserted into a holding fixture of a housing, in particular a transmission housing. In so doing, the bearing is accommodated in the holding element in a form-fit or force-closed manner.

In order to install the drive motor on a housing of a transmission drive assembly, it is known from practice to dispose a holding element in a first axial end position. Said first end position is achieved by pressing the holding element against an abutment element, in particular against a part that is at least indirectly coupled to a brush device of the drive motor. The problem with this is that the holding element tends to make noise in said end position during the operation of the transmission drive assembly and also mechanically stresses the brush device.

SUMMARY OF THE INVENTION

Based on the prior art described above, the aim underlying the invention is to develop a transmission drive assembly in such a way that a simple installation process is achieved by means of the constructive embodiment of the transmission drive assembly; thus enabling a secure and defined end position of the holding element to be achieved after installation on or in the transmission housing. At such an end position, noises are reduced and the mechanical stress on the brush device is reduced by means of the holding element being axially spaced apart from the brush device. A transmission drive assembly inventively meets the aforementioned aim in that, in an installation position for introducing and positioning the holding element in the holding fixture of the transmission housing, the holding element is positioned in a first axial end position defined by an abutment element of the drive motor, and in that, in an end position of the drive shaft in the transmission housing, the holding element can be slid by means of a sliding element on the drive shaft into a second axial end position which is axially remote from the at least one abutment element. In other words, this means that, in order to install the drive motor on the transmission housing, the holding element initially assumes a defined first target position from which said holding element is brought during the installation into the second, final target position. By means of these two target positions, defined positions of the holding element and consequently the bearing device are thus produced on the drive shaft, which positions facilitate a particularly reliable installation process and moreover prevent the aforementioned disadvantages of the prior art.

In order to achieve the first axial end position of the holding element, provision is made in a design implementation of the invention for the holding element to abut on the side facing away from the holding fixture of the transmission housing with an end face thereof at least indirectly against a device, in particular a brush holder device of the drive motor, that acts as an abutment element and is disposed on the drive shaft in an axially fixed manner. The already available brush holder or a retaining ring for the brush holder is thus used as an abutment element for the holding element.

Provision is made in this case in a particularly preferred manner for the holding element to comprise a flange-like circumferential edge which forms the end face and for said edge to interact with at least one retaining element that delimits a displaceability of the holding element on the drive shaft. As a result, a particularly secure or planar abutment of the holding element against the device (brush holder or retaining ring) is facilitated on the one hand; while, on the other hand, the holding element can be reliably prevented from detaching from the drive shaft or getting lost during installation.

In order to achieve a defined target position of the bearing device on the drive shaft in the second axial end position and on the other hand to keep the displacement forces for the holding element to achieve the second end position as small as possible, provision is additionally made in a further advantageous embodiment for the bearing to be axially fixed in the holding element and to be disposed on the drive shaft in an axially displaceable manner.

In order to achieve the axial displaceability of the holding element on the drive shaft by means of the sliding element, it is proposed that the holding element comprises a radially circumferential wall and that at least one recess is formed in the wall, said recess interacting with the sliding element to axially displace said holding element.

In a particularly simple manner, a displacement of the holding element is brought about if the sliding element or the recess comprises at least one chamfer which causes an axial displacement of the holding element by the action of the sliding element thereon.

In an embodiment which is advantageous in terms of costs and manufacturing technology, it is proposed that the holding element is embodied as a deep drawn component and the recess as an opening and that the at least one chamfer is formed on the sliding element.

An embodiment of the invention is very particularly preferred in which the sliding element is a constituent part of the transmission housing, in particular a cover element of the transmission housing. In so doing, additional, separate components required for sliding the holding element are, on the one hand, not needed; and, on the other hand, it can be ensured by a corresponding configuration of the transmission housing or the cover element that the holding element achieves the target position thereof after the cover element has been installed.

As an alternative, it is however also conceivable that the sliding element is embodied as a component that is separate from the transmission housing. Such an embodiment has the advantage that the arrangement or configuration of the recess on the holding element can occur independently, for example, of the disposal of the cover element.

In order to furthermore design the installation process in a particularly simple and reliable manner, provision can be made for the holding fixture in the transmission housing to be delimited by a wall, in which an opening is configured, and for the opening to be arranged in alignment with the recess and to form a guideway for the sliding element.

BRIEF DESCRIPTION OF THE DRAWINGS

Further advantages, features and details of the invention ensue from the following description of preferred exemplary embodiments as well as with the aid of the drawings.

In the drawings.

DETAILED DESCRIPTION

Figure 1:
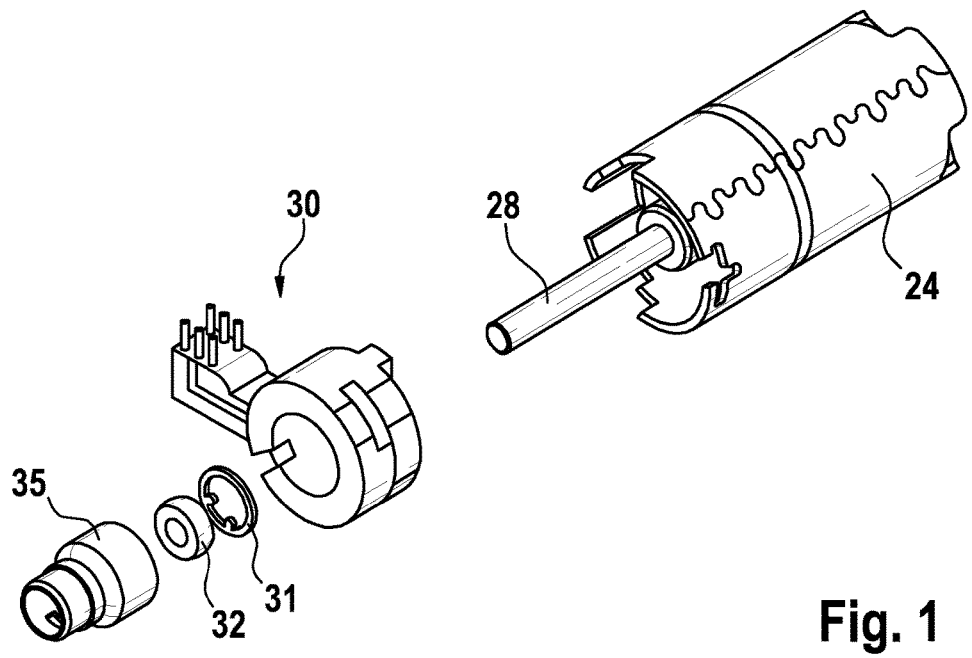
FIGS. 1 and 2: show components of a drive motor of a transmission drive assembly prior to and after the installation of a brush holder device and of a holding element, in a perspective view.

Identical components or components serving the same function are provided with the same reference numerals in the figures.

Figure 4:
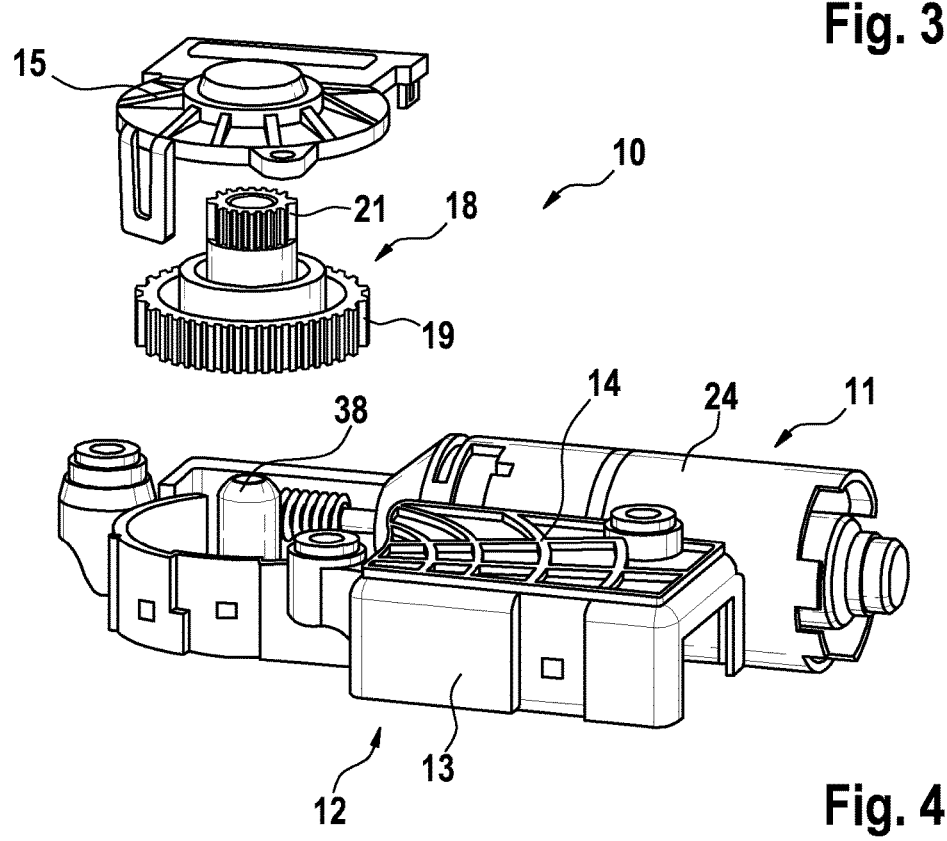
FIG. 4: shows a drive motor that has already been installed in a modified transmission housing prior to closing the transmission housing by means of a transmission cover, in a perspective view.

In FIG. 4, the essential components of a transmission drive assembly 10 according to the invention are depicted as they serve as a constituent part of a comfort and convenience drive, for example of a window regulator drive, a sunroof drive, a seat adjustment drive or the like, in a motor vehicle. The transmission drive assembly 10 comprises a drive motor 11 which is designed as a (mechanically commutated) electric motor and is connected to a drive housing 12 or is flange-mounted to the same. The transmission housing 12 has, for example, a shell-like lower part 13, the open top side of which can be closed by means of two separate transmission housing covers 14, 15 (depicted as housing cover 14 in FIG. 4), in particular by means of screw or detent connections that are not individually depicted in detail.

The transmission housing 12 also comprises an opening 17 which only by way of example is in alignment with the longitudinal axis of the drive motor 11 and which serves as an insertion opening for inserting plug-in electronics comprising the plug disposed thereon for contacting to the wiring harness of the motor vehicle (not depicted). A single-stage or multi-stage transmission, which, as can be seen in FIG. 4, has a spur gear having external teeth 19, is disposed within the transmission housing 12. The spur gear 18 furthermore comprises a driving section 21 which protrudes from the transmission housing 12 at the upper side thereof and is connected at least indirectly to an element of the transmission drive assembly that is to be adjusted, in particular to a window pane or a seat.

The external teeth 19 of the spur gear 18 mesh with a toothed section 22 of a drive shaft 23 of the drive motor 11. To this end, a portion 25 protruding from the housing 24 of the drive motor 11 protrudes into the transmission housing 12, wherefore the transmission housing 12, in the depicted exemplary embodiment the lower part thereof, comprises an annular holding fixture 27 in which the portion 25 of the drive motor 11 can be inserted.

Figure 2:
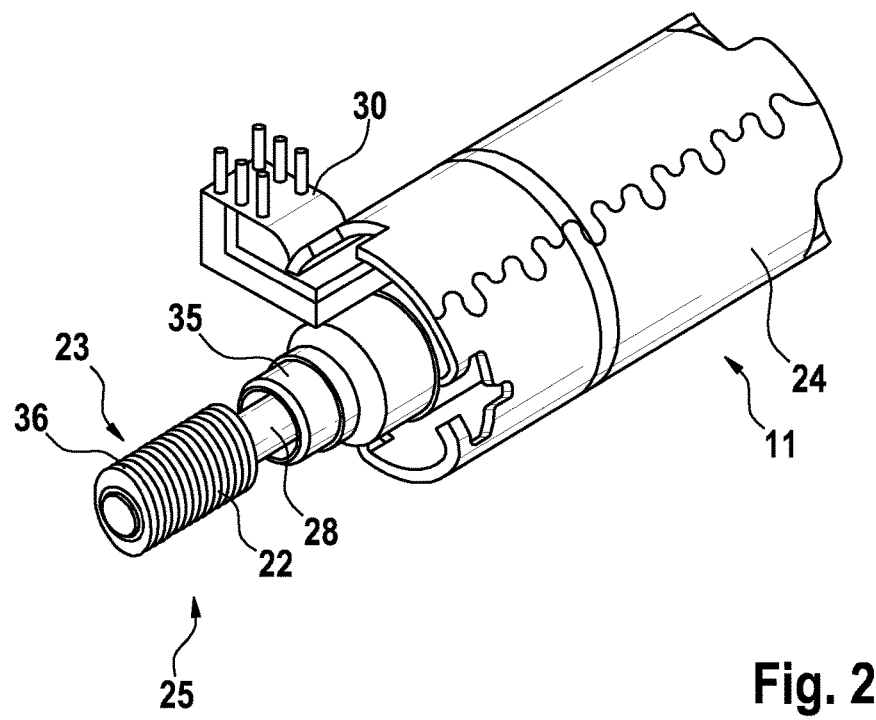

As can especially be seen in FIGS. 1 and 2, the drive motor 11 comprises an armature that is disposed within the housing 24 and cannot be seen in the figures, wherein an armature shaft 28 simultaneously forms the drive shaft 23. A brush holder device 30 can be mounted in an axial direction on the armature shaft 28, said device being fixed in the axial position thereof in the housing 24 by means of an interference fit. A bearing 32, e.g. in the form of a cup and ball bearing, is furthermore disposed on the armature shaft 28, the axial position of which bearing is determined by a retaining ring 21 arranged on the armature shaft 28. The bearing 32 is accommodated within a substantially sleeve-shaped holding element 35 that encompasses the bearing 32 on the outer circumference thereof in a form-fit and force-closed manner such that the bearing 32 is radially fixed within the holding element 35. On the other hand, the inside diameter of the bearing 32 or the outside diameter of the armature shaft 28 is dimensioned in such a way that the bearing 32 can be axially displaced on the armature shaft 28 without the position thereof within the holding element 35 being thereby altered. The holding element 35 preferably consists of sheet metal and is designed as a deep drawn component. Finally a sleeve-shaped gear element 36 can be pushed onto the armature shaft 28 and is connected there, for example, by means of a press-fit or a laser weld, said gear element supporting the toothed section 22.

Figure 3:
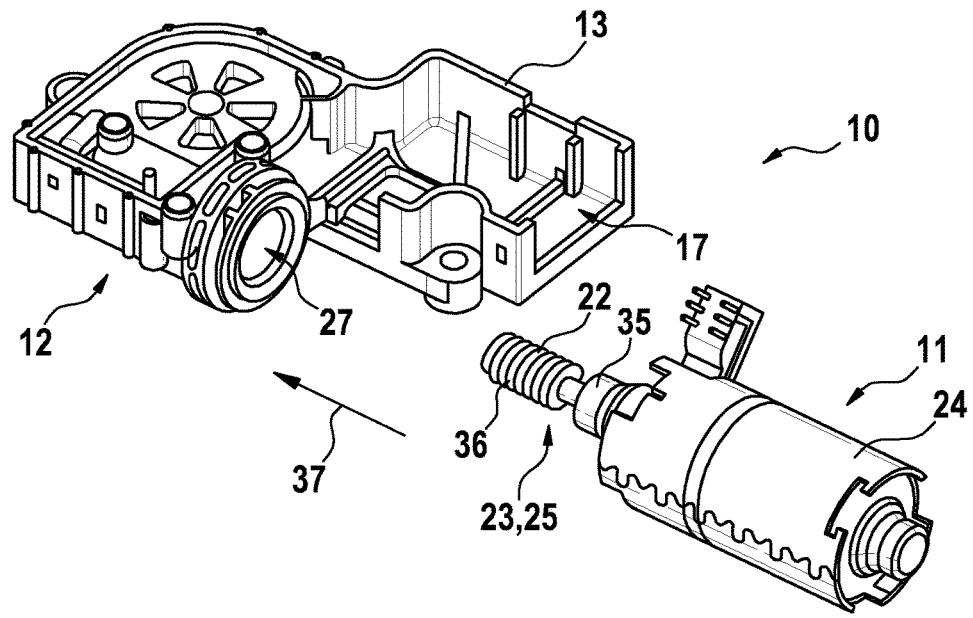
FIG. 3: shows the drive motor pursuant to FIG. 2 prior to installation in a transmission housing, in a perspective view.

The drive motor 11 described to this point can be connected in accordance with FIG. 3 to the transmission housing 12 in the direction of the arrow 37 by the portion 25 of the drive shaft 23 being inserted into the holding fixture 27. In accordance with FIG. 4, the spur gear 18 is subsequently mounted by being fitted onto an axis 38 within the transmission housing 12, wherein the engagement is simultaneously produced between the external teeth 19 of the spur gear 18 and the toothed section 22 of the drive shaft 23.

Figure 5:
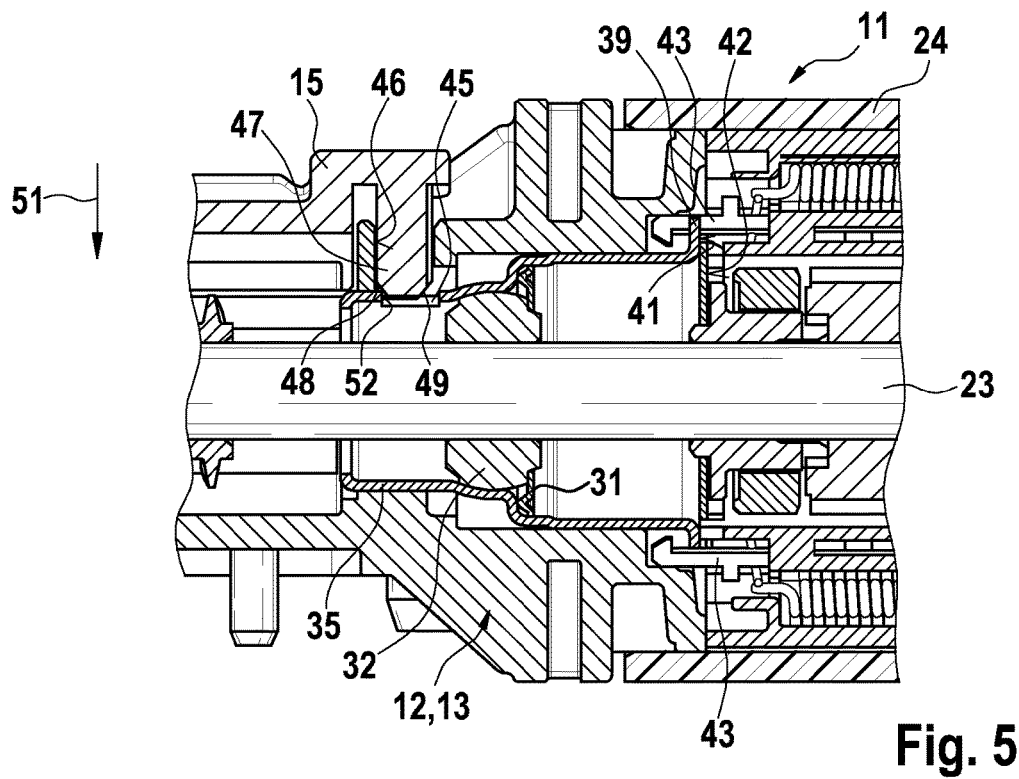
FIGS. 5 and 6: show the region of a holding element in the region of the transmission housing prior to and after installation of a transmission housing cover, in longitudinal cross section.

The condition is depicted in FIG. 5 in which the drive shaft 23 of the drive motor 11 is situated shortly before attaining the axial end position thereof within the transmission housing 12. In addition, the condition is also depicted in FIG. 5 in which the holding element is situated in the installation position which occurs prior to introducing the portion 25 of the drive shaft into the transmission housing. It can particularly be seen that a radially circumferential, flange-like edge 39 of the holding element 35 abuts with an end face 41 against the opposing end face 42 of the brush holder device 30. The holding element 35 is thus located in direct abutting contact with the brush holder device 30. This position represents a first axial end position of the holding element 35 on the drive shaft 23. Furthermore, the bearing 32 abuts against the retaining ring 31.

A plurality of retaining elements in the form of detent hooks 43, which are disposed at uniform angular distances to one another, engage behind the edge 39 of the holding element 35. Said detent hooks delimit the axial mobility of the holding element 35 on the drive shaft 23 in a direction opposite to the brush holder device 30.

A recess 45 can furthermore be seen in the wall of the holding element 35 on the side of the bearing 32 opposite to the edge 39. Said recess is configured in the form of an opening and is aligned with the (open) opening of the lower part 13 of the transmission housing 12. The annular holding fixture 27 of the transmission housing 12 has an opening 46 in a wall of said holding fixture 27 in alignment or superposition with the recess 45. A sliding element in the form of a projection 47 protrudes through the opening 46, said projection being integrally formed on the lower side of the second transmission housing cover 15. The projection 47 has two bevels or chamfers 48, 49 on the side thereof facing the opening 46 or, respectively, the recess 45. Furthermore, the width of the projection 47 is matched to the width of the opening 46 such that the opening 46 forms a guideway for the projection 47 when introducing the transmission housing cover 15 into the opening 46 in accordance with the arrow 51.

Figure 6:
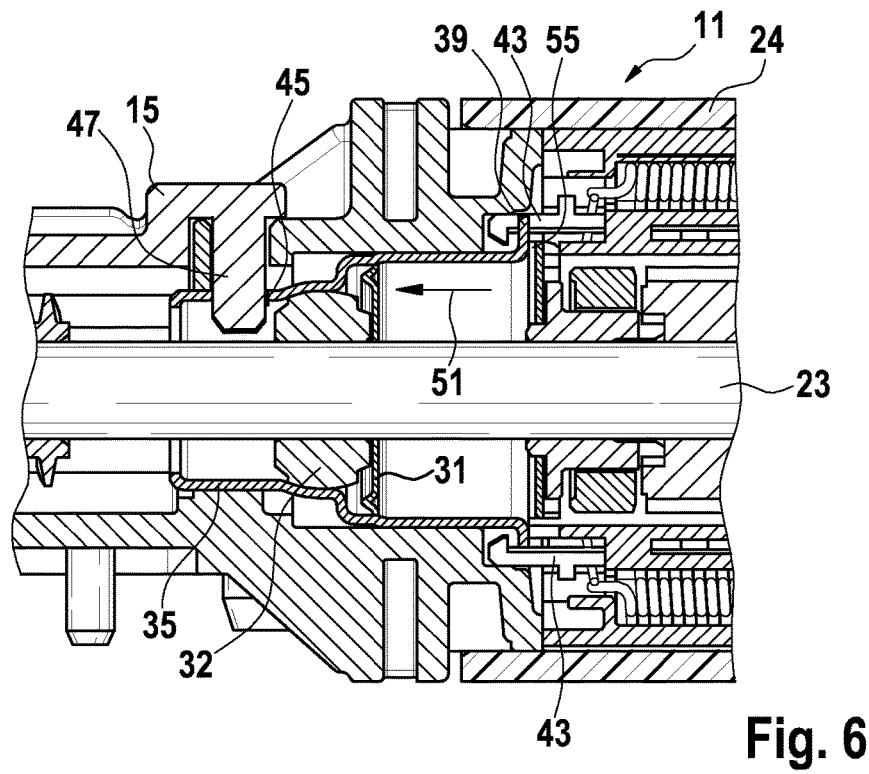

A condition is depicted in FIG. 5 in which a chamfer 48 has just moved into abutting contact with the associated edge 52 of the recess 45 of the holding element 35 when mounting the transmission housing cover 15 corresponding to the direction of the arrow 51. As can be seen with the aid of FIG. 6, the projection 47 is completely introduced into the recess 45 when the transmission housing cover 15 is further pressed down in the direction of the arrow 51. This results in the holding element 35 being moved axially on the armature shaft 28 in the direction of arrow 53; thus enabling a gap to form between the end face 41 of the edge 39 and the opposing end face 42 of the brush holder device 30. A decoupling of the holding element 35 from the brush holder device 30 is effected by the gap 55 which results in the holding element 35 being decoupled from noise and the brush holder device 30 being relieved of mechanical stress. In FIG. 6, the holding element 35 is consequently disposed in the axial (second) end position thereof on the armature shaft 28. In particular by means of screwing or latching the transmission housing cover 15 to the lower part 13 of the transmission housing 12, it is ensured during the operation of the transmission drive assembly 10 that this axial end position of the holding element 35 no longer changes.

Figure 7:
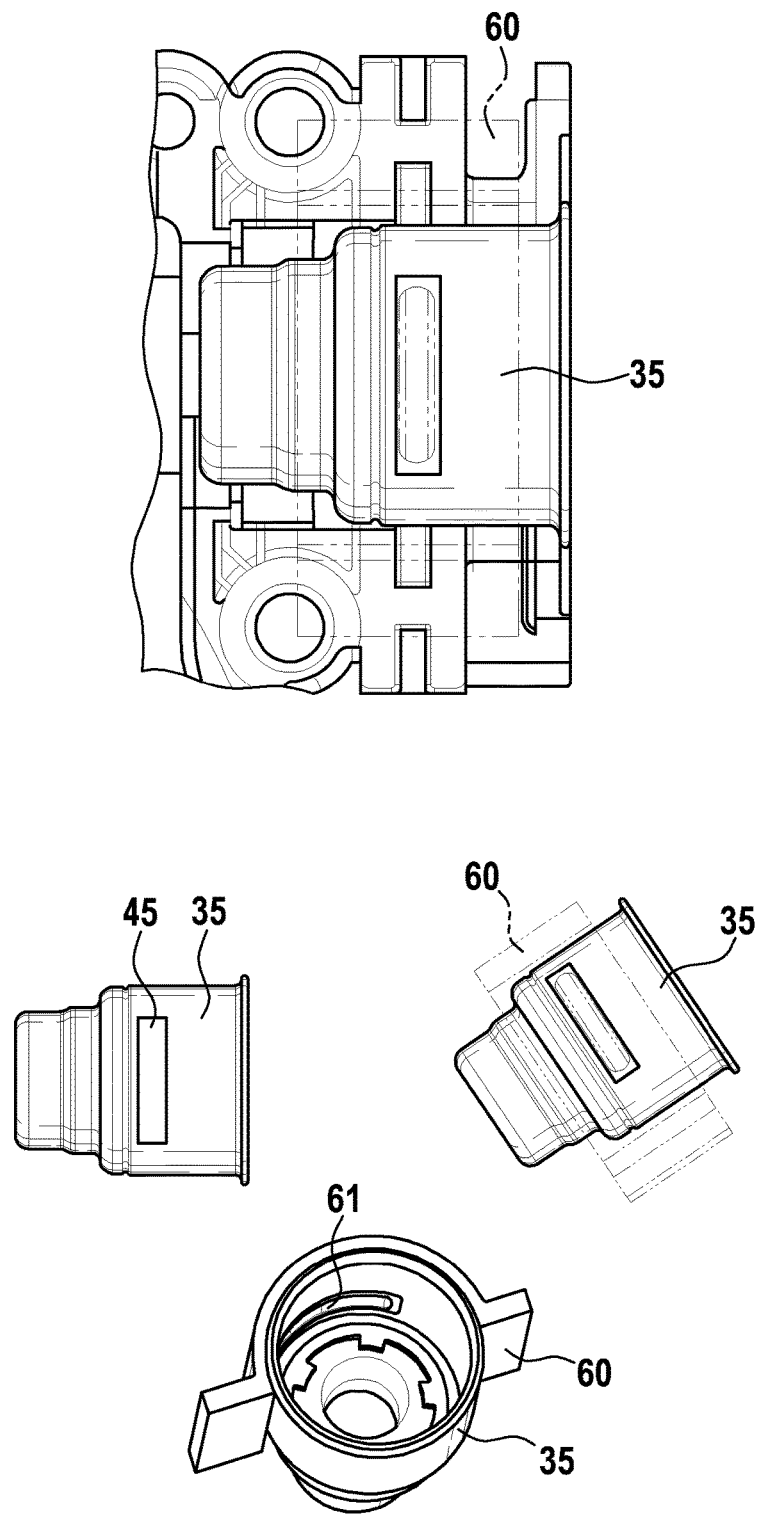
FIGS. 7 and 8: show in each case different embodiments having an installation of the holding element that has been modified with respect to FIGS. 6 and 7.

In the exemplary embodiment of the invention depicted in FIGS. 5 and 6, the second axial end position of the holding element 35 is ensured by the sliding element which is configured in the form of a projection 47 and is integrally formed on the transmission housing cover 15. In the exemplary embodiment depicted in FIG. 7, the sliding element is in contrast designed as component in the form of a bearing clamp 60 that is separate from the transmission housing cover 15. The bearing clamp 60 has a projection 61 on the side of the holding element 35 facing the recess 45, said projection interacting directly with the recess 45, if applicable without guidance of an annular holding fixture 27 as is the case with the initially described exemplary embodiment.

Figure 8:
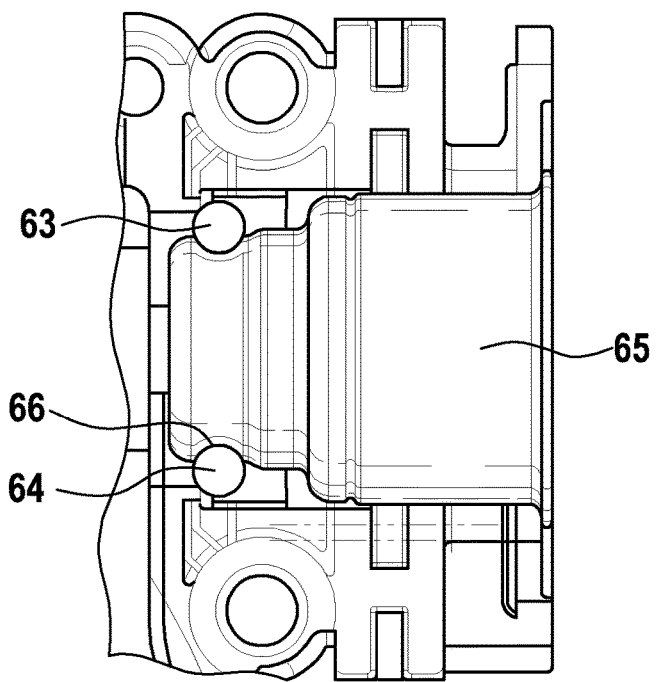
Figure 8:
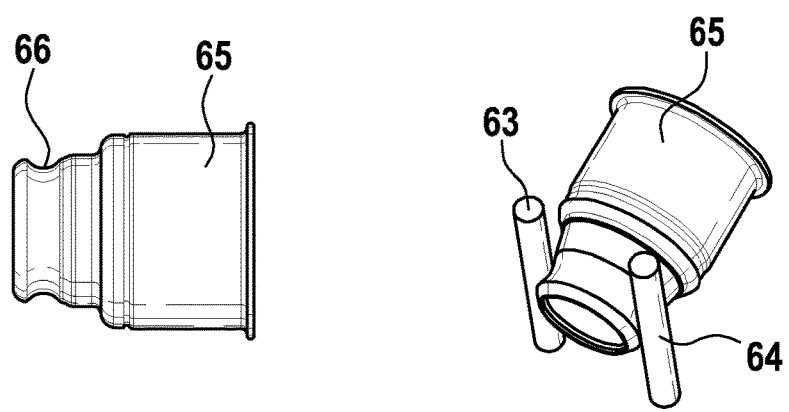

Finally in FIG. 8, an exemplary embodiment is depicted in which an axial adjustment of the holding element 65 is effected by two pin-shaped elements 63, 64 which engage in a radially circumferential annular groove 66 formed on the holding element 65. To this end, corresponding holding bores for the elements 63, 64 are, for example, formed in the lower part 13 of the transmission housing 12; thus enabling said elements 63, 64 to be inserted axially into the holding bores and thus axially position the holding element 65 on the armature shaft 28. A transmission housing cover (not depicted) is subsequently placed on the lower part 13, which, as the case may be, simultaneously secures the elements 63, 64. As an alternative, the elements 63, 64 can also be disposed so as to be integrated into a housing cover (not depicted).

The transmission drive assembly 10 described to this point can be altered or modified in a variety of ways without deviating from the inventive concept. Said concept consists of effecting the axial (second) end position of the holding element 35, 65 during installation in or on the transmission housing, wherein particularly good acoustic and/or mechanical properties of the transmission drive assembly 10 are achieved by means of the axial decoupling of the holding device 35, 65.

The invention claimed is:

1. A transmission drive assembly (10) having a drive motor (1) the drive shaft (23) of which protrudes with a portion (25) thereof into a transmission housing (12), wherein the drive shaft (23) is arranged on a side facing the transmission housing (12) in a bearing which is held in a form-fit or force-closed manner in a substantially sleeve-shaped holding element (35; 65) which is arranged in a holding fixture (27) of the transmission housing (12), characterized in that, in an installation position for introducing and positioning the holding element (35; 65) in the holding fixture (27) of the transmission housing (12), the holding element (35; 65) is positioned in a first axial end position defined by an abutment element (30) of the drive motor (11), and in that, in an end position of the drive shaft (23) in the transmission housing (12), the holding element (35; 65) can be slid by means of a sliding element (47; 61; 62, 63) on the drive shaft (23) into a second axial end position which is axially remote from the at least one abutment element.

2. The transmission drive assembly according to claim 1, characterized in that the holding element (35; 65) abuts, on a side facing away from the holding fixture (27) of the transmission housing (12), with an end face (41) thereof at least indirectly against a device, which acts as an abutment element and is disposed in an axially fixed manner on the drive shaft (23).

3. The transmission drive assembly according to claim 2, characterized in that the holding element (35; 65) has a flange-like circumferential edge (39) which forms the end face (41) and in that the edge (39) interacts with at least one retaining element (43) which delimits a displaceability of the holding element (35; 65) on the drive shaft (23).

4. The transmission drive assembly according to claim 1, characterized in that the bearing (32) is axially fixed in the holding element (35; 65) and is disposed in an axially displaceable manner on the drive shaft (23), and axially abuts against a retaining ring (31) in the installation position.

5. The transmission drive assembly according to claim 1, characterized in that the holding element (35) has a radially circumferential wall and in that at least one recess (45) is formed in the wall, said recess interacting with the sliding element to axially displace the holding element (35).

6. The transmission drive assembly according to claim 5, characterized in that one of the sliding element (47; 61) and the recess (45) has at least one chamfer (48, 49) which effects an axial displacement of the holding element (35) by action of the sliding element (47; 61) thereon.

7. The transmission drive assembly according to claim 6, characterized in that the holding element (35) is embodied as a deep drawn component and the recess (45) as an opening, and in that the at least one chamfer (48, 49) is formed on the sliding element (47; 61).

8. The transmission drive assembly according to claim 1, characterized in that the sliding element (47) is a constituent part of the transmission housing (12).

9. The transmission drive assembly according to claim 1, characterized in that the sliding element (60; 63, 64) is embodied as a component that is separate from the transmission housing (12).

10. The transmission drive assembly according to claim 6, characterized in that the holding fixture (27) in the transmission housing (12) is delimited by a wall in which an opening (46) is configured, and in that the opening (46) is disposed in alignment with the recess (45) and forms a guideway for the sliding element (47).

11. The transmission drive assembly according to claim 1, characterized in that the holding element (35; 65) abuts, on a side facing away from the holding fixture (27) of the transmission housing (12), with an end face (41) thereof at least indirectly against a brush holder device (30) of the drive motor (11), which acts as an abutment element and is disposed in an axially fixed manner on the drive shaft (23).

12. The transmission drive assembly according to claim 1, characterized in that the sliding element (47) is a constituent part of a cover element (15) of the transmission housing (12).

\* \* \* \* \*